United States Patent
Hsu et al.

(10) Patent No.: US 8,857,259 B2
(45) Date of Patent: Oct. 14, 2014

(54) READING CIRCUIT OF GYROSCOPE

(75) Inventors: Yu-Wen Hsu, Tainan (TW); Sheng-Ren Chiu, Tainan (TW); Lu-Po Liao, Taipei (TW); Shih-Ting Lin, Hualien County (TW)

(73) Assignee: Industrial Technology Research Institute, Hsinchu (TW)

( * ) Notice: Subject to any disclaimer, the term of this patent is extended or adjusted under 35 U.S.C. 154(b) by 289 days.

(21) Appl. No.: 13/430,685

(22) Filed: Mar. 26, 2012

(65) Prior Publication Data

US 2013/0160544 A1 Jun. 27, 2013

(30) Foreign Application Priority Data

Dec. 26, 2011 (TW) .............................. 100148635 A

(51) Int. Cl.
   *G01C 19/56* (2012.01)
(52) U.S. Cl.
   USPC ..................................... 73/504.12; 73/504.04
(58) Field of Classification Search
   CPC ........... G01C 19/5719; G01C 19/5726; G01C 19/56; G01C 19/5649; G01C 19/5642; G01C 19/5607
   USPC ................ 73/504.02, 504.04, 504.12, 504.14
   See application file for complete search history.

(56) References Cited

U.S. PATENT DOCUMENTS

| | | | |
|---|---|---|---|
| 6,067,858 A * | 5/2000 | Clark et al. | 73/504.16 |
| 6,311,555 B1 * | 11/2001 | McCall et al. | 73/488 |
| 6,671,648 B2 * | 12/2003 | McCall et al. | 702/141 |
| 7,275,433 B2 * | 10/2007 | Caminada et al. | 73/514.18 |
| 7,423,568 B2 | 9/2008 | Hellwig et al. | |
| 7,891,245 B2 | 2/2011 | Murakami et al. | |
| 2006/0277995 A1 | 12/2006 | Kutsuna | |
| 2007/0236373 A1 | 10/2007 | Hellwig et al. | |
| 2008/0148847 A1 | 6/2008 | Sato et al. | |
| 2008/0190198 A1 | 8/2008 | Prandi et al. | |
| 2008/0276708 A1 | 11/2008 | Kurihara | |
| 2010/0259318 A1 | 10/2010 | Bien et al. | |
| 2011/0101994 A1 | 5/2011 | Hsu et al. | |

FOREIGN PATENT DOCUMENTS

| | | |
|---|---|---|
| CN | 1774613 | 5/2006 |
| CN | 201688848 | 12/2010 |
| EP | 1164353 | 12/2001 |
| TW | 201040534 | 11/2010 |
| TW | 201102616 | 1/2011 |

OTHER PUBLICATIONS

Notice of Allowance of Taiwan Counterpart Application, issued on Oct. 8, 2013, p. 1-p. 4.

(Continued)

*Primary Examiner* — Helen Kwok
(74) *Attorney, Agent, or Firm* — Jianq Chyun IP Office

(57) ABSTRACT

A reading circuit of a gyroscope is provided. The reading circuit includes a driving unit, a high pass filter, a signal processing unit, and a low pass filter. The driving unit generates a resonance signal for a resonator of the gyroscope and generates a demodulation signal for the signal processing unit. The signal processing unit provides a modulation signal to a Coriolis accelerometer of the gyroscope. An input terminal of the high pass filter receives an output signal of the Coriolis accelerometer. The signal processing unit processes and demodulates an output of the high pass filter according to the demodulation signal and outputs a demodulation result to the low pass filter.

16 Claims, 6 Drawing Sheets

(56) References Cited

OTHER PUBLICATIONS

Ezekwe et al., "A Mode-Matching ΣΔ Closed-Loop Vibratory Gyroscope Readout Interface With a 0.004°/s/√Hz Noise Floor Over a 50 Hz Band", IEEE Journal of Solid-State Circuits, Dec. 2008, pp. 3039-3048, vol. 43, No. 12.

Aaltonen et al., "Pseudo-Continuous-Time Readout Circuit for a 300/s Capacitive 2-Axis Micro-Gyroscope", IEEE Journal of Solid-State Circuits, Dec. 2009, pp. 3609-3620, vol. 44, No. 12.

Raman et al., "A Closed-Loop Digitally Controlled MEMS Gyroscope With Unconstrained Sigma-Delta Force-Feedback", IEEE Sensors Journal, Mar. 2009, pp. 297-305, vol. 9, No. 3.

Saukoski et al., "Interface and Control Electronics for a Bulk Micromachined Capacitive Gyroscope", Sensor and Actuators A:Physical, 2008, pp. 183-193, vol. 147.

Lemkin et al., "A Three-Axis Micromachined Accelerometer with a CMOS Position-Sense Interface and Digitak-Trim Electronics", IEEE Journal of Solid-State Circuits, Apr. 1999, pp. 456-468, vol. 34, No. 4.

\* cited by examiner

READING CIRCUIT OF GYROSCOPE

CROSS-REFERENCE TO RELATED APPLICATION

This application claims the priority benefit of Taiwan application serial no. 100148635, filed on Dec. 26, 2011. The entirety of the above-mentioned patent application is hereby incorporated by reference herein and made a part of this specification.

TECHNICAL FIELD

The disclosure relates to a sensing device, and more particularly, to a reading circuit of a gyroscope.

BACKGROUND

Along with the widespread of 3C (Computer, Communication, Consumer electronics) products and consumable electronic products (for example, smart phone, tablet PC (personal computer), and motion-sensing game console) in recent years, the market demand for microelectronic inertial devices (for example, accelerometer and gyroscope) has been exploding. The design of gyroscope is going towards digital output and high precision. Thus, many international manufacturers devote considerable resources to the development of new generation digital inertial sensors with high performance-price ratio. In particular, because the accelerometer techniques have relatively matured, the performance-price ratio of digital angular-rate sensors will determine the competitiveness of the digital inertial sensors in the inertial device market.

A Coriolis accelerometer in a conventional gyroscope outputs two signals: an angular-rate signal and a resonance signal which has the same oscillation frequency but different phase as a resonator. Thus, the resonance signal needs to be removed from the output of the Coriolis accelerometer through demodulation to obtain the angular-rate signal. If a stray capacitance and inductance effect occurs between the Coriolis accelerometer and the resonator, a coupling influence is received by the output signal of the Coriolis accelerometer from the resonance signal, so that an error occurs on an output terminal of the gyroscope. Because the output signal of the resonator and the output signal of the Coriolis accelerometer have almost the same frequency, the resonance signal cannot be filtered out by using a filter in a reading circuit. However, the interference produced by the resonance signal is a major factor in the reduction of the output accuracy of the gyroscope, and whether the gyroscope can provide an accurate angular rate measurement is determined by whether the resonance signal can be removed. Thereby, the signal output by any conventional Coriolis accelerometer comes with the interference of a resonance signal.

SUMMARY

According to an embodiment of the disclosure, a reading circuit of a gyroscope is provided. The reading circuit includes a driving unit, a high pass filter, a signal processing unit, and a low pass filter. The driving unit generates a resonance signal for a resonator of the gyroscope and generates a demodulation signal for the signal processing unit. An input terminal of the high pass filter receives an output signal of a Coriolis accelerometer of the gyroscope. The signal processing unit is coupled to the driving unit and the high pass filter. The signal processing unit provides a modulation signal to the Coriolis accelerometer and processes and demodulates an output of the high pass filter according to the demodulation signal to output a demodulation result. The low pass filter is coupled to the signal processing unit for receiving the demodulation result.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure provides a reading circuit of a gyroscope, in which the problem of interference produced by a resonance signal on an output signal of a Coriolis accelerometer is resolved. In an embodiment of the disclosure, a modulation signal is input to the Coriolis accelerometer to modulate an output signal of the Coriolis accelerometer to a high frequency, and an interference signal produced by the resonator is then filtered out by using a high pass filter. Thereby, in a reading circuit provided by an embodiment of the disclosure, the problem of interference produced by a resonance signal on an output signal of a Coriolis accelerometer is resolved.

Figure 1:
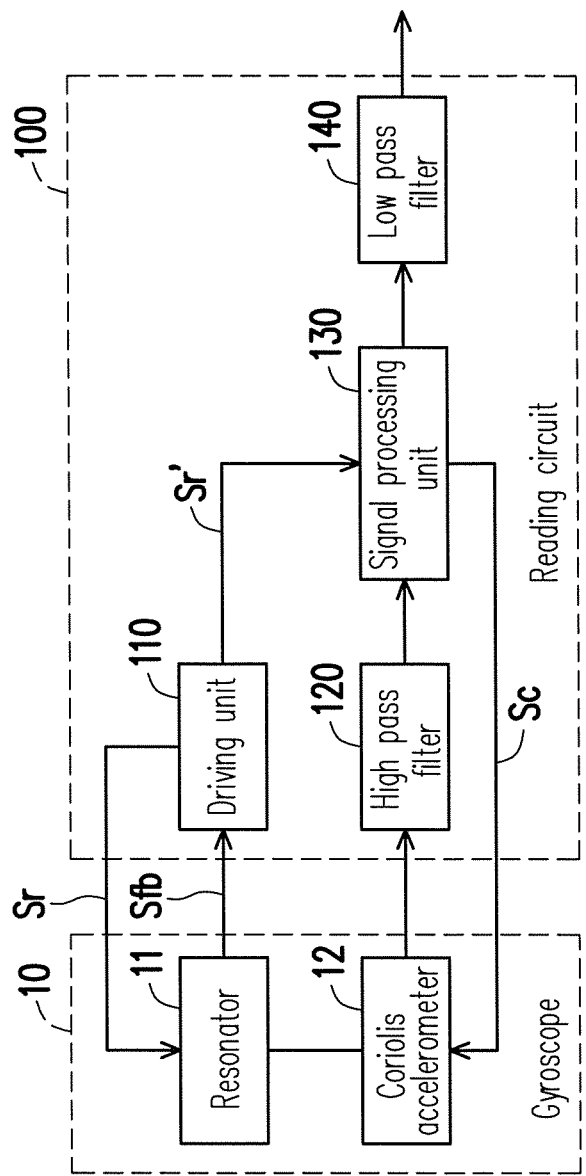
FIG. 1 is a block diagram of a reading circuit of a gyroscope according to an embodiment of the disclosure.

FIG. 1 is a block diagram of a reading circuit 100 of a gyroscope 10 according to an embodiment of the disclosure. The gyroscope 10 and the resonator 11 and the Coriolis accelerometer 12 thereof can be implemented as any resonant gyroscope, such as a conventional micro-electromechanical system (MEMS) gyroscope or any new gyroscope. A resonant gyroscope has a mass block, and the resonator 11 oscillates the mass block according to a resonance signal Sr. An external force displaces the resonator 11 in the gyroscope 10. In order to maximize the efficiency in the detection of the external force, the resonator 11 usually works on a resonance point to allow the resonator 11 to generate the maximum displacement and speed. The force detected by the Coriolis accelerometer 12 of the gyroscope 10 is $F=-2\,m\Omega v$, wherein m is the mass of the mass block, $\Omega$ is the angular rate of the mass block, and v is a radial velocity. When the gyroscope 10 rotates, the Coriolis accelerometer 12 detects an acceleration. The reading circuit 100 demodulates the output of the Coriolis accelerometer 12 to obtain an angular rate signal.

Referring to FIG. 1, the reading circuit 100 includes a driving unit 110, a high pass filter 120, a signal processing unit 130, and a low pass filter 140. The driving unit 110 provides the resonance signal Sr to a driving end of the resonator 11 in the gyroscope 10 and generates a demodulation signal Sr' for the signal processing unit 130. The frequency of the demodulation signal Sr' is the same as the oscillation frequency of the resonator 11, but the phase thereof is different from that of the resonator 11. The demodulation signal Sr' can be used for demodulating the output of the Coriolis accelerometer. In the embodiment, the phase difference between the demodulation signal Sr' and the resonance signal Sr is usually about 90°.

In other embodiments, the driving unit 110 provides the resonance signal Sr to the resonator 11 with an open-loop structure (without a feedback path). In the embodiment, the driving unit 110 further receives a feedback signal Sfb from a sensing end of the resonator 11. The driving unit 110 can adjust the frequency of the resonance signal Sr to the resonance frequency of the resonator 11 according to the feedback signal Sfb.

The input terminal of the high pass filter 120 receives the output signal of the Coriolis accelerometer 12. The signal processing unit 130 is coupled to the driving unit 110 and the high pass filter 120. The signal processing unit 130 provides a modulation signal Sc to the Coriolis accelerometer 12. To separate angular rate information from the output signal of the Coriolis accelerometer 12, the signal processing unit 130 processes and demodulates the output of the high pass filter 120 according to the demodulation signal Sr' and outputs a demodulation result, so that the angular rate of the gyroscope 10 can be restored to a low frequency.

The low pass filter 140 is coupled to the signal processing unit 130 for receiving the demodulation result of the signal processing unit 130. The low pass filter 140 filters out the high-frequency portion in the demodulation result and outputs the low-frequency angular rate information. The low pass filter 140 outputs the angular rate information of the gyroscope 10 to the circuit at the next level (for example, a host processor). The low pass filter 140 may be an analog filter or a digital filter. In some embodiments, if the signal processing unit 130 is in an analog form, the low pass filter 140 is then an analog filter, and the reading circuit 100 can have an analog-to-digital converter (ADC) serially connected after the low pass filter 140 according to the design requirement to convert the output angular rate value into a digital value. In other embodiments, if the signal processing unit 130 is a Sigma-Delta circuit or a circuit with similar function, the low pass filter 140 is then a digital filter and no additional ADC is required in the reading circuit 100.

In the embodiment, the frequency of the modulation signal Sc is greater than that of the resonance signal Sr. In the embodiment, the modulation signal Sc is input to the Coriolis accelerometer 12 and the angular rate of the Coriolis accelerometer 12 is modulated to a high frequency. The high pass filter 120 receives the output of the Coriolis accelerometer 12 (a high-frequency signal carrying the angular rate information and a low-frequency noise signal from the resonator 11) and filters out the noise signal from the resonator 11. Thereby, the reading circuit 100 in the embodiment can resolve the problem of interference produced by the resonance signal from the resonator 11 on the output signal of the Coriolis accelerometer 12.

Figure 2:
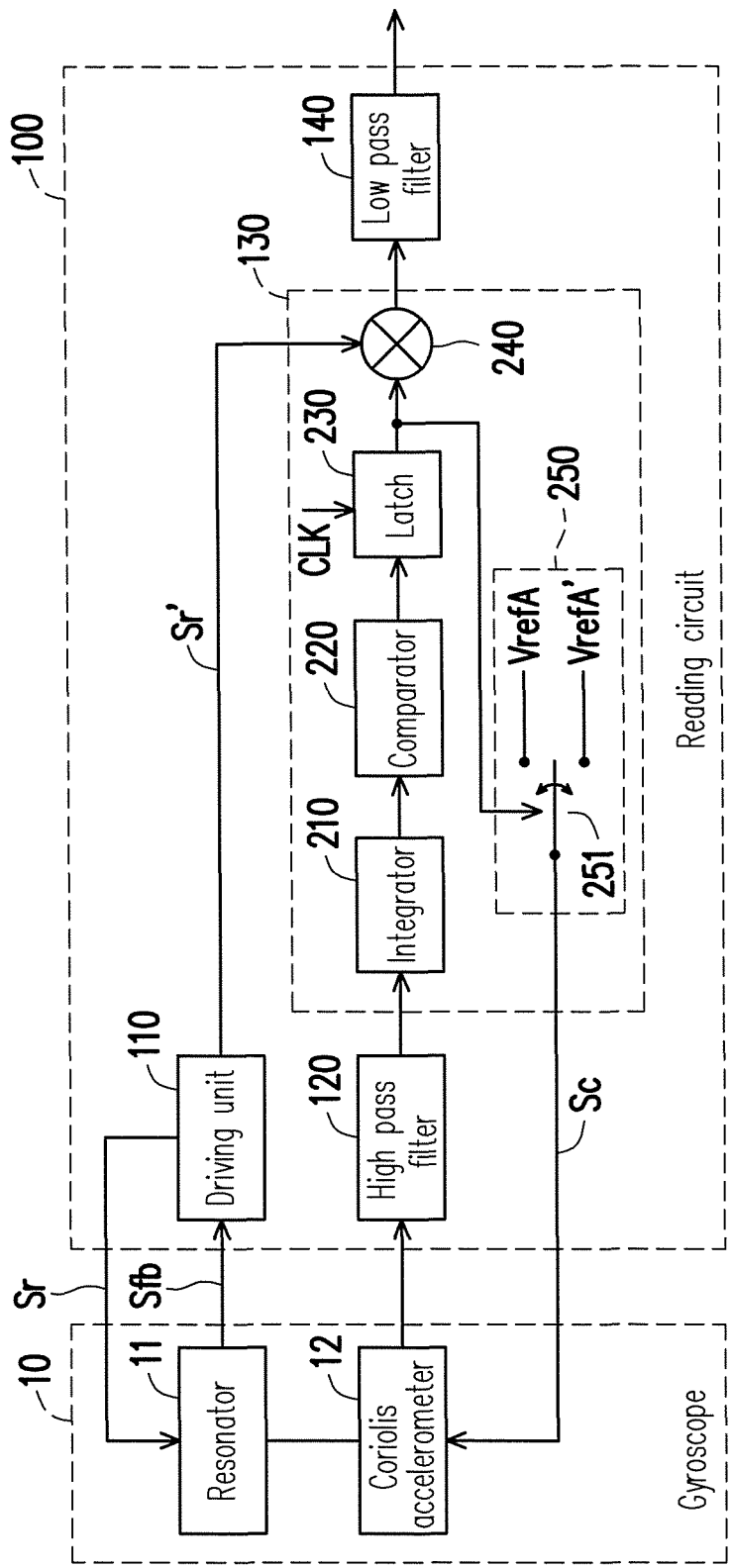
FIG. 2 is a block diagram of a signal processing unit in FIG. 1 according to an embodiment of the disclosure.

FIG. 2 is a block diagram of the signal processing unit 130 in FIG. 1 according to an embodiment of the disclosure. The embodiment illustrated in FIG. 2 can be referred to related descriptions of FIG. 1. In the embodiment illustrated in FIG. 2, the signal processing unit 130 includes a Sigma-Delta modulator (SDM) composed of an integrator 210, a comparator 220, a latch 230 and a modulation signal generator 250. The modulation signal generator 250 is coupled to the Coriolis accelerometer 12 for providing the modulation signal Sc required by the SDM. The Coriolis accelerometer 12 loads angular rate information into the modulation signal Sc. Herein the output signal of the Coriolis accelerometer 12 contains two parts: one is the modulation signal carrying the resonance information of the angular rate and the resonator, and the other is the noise signal having the resonance frequency of the resonator 11.

In other embodiments, the modulation signal generator 250 provides a high-frequency clock signal with fixed frequency/phase as the modulation signal Sc. In the embodiment, the modulation signal generator 250 includes a first voltage source, a second voltage source, and a switch 251. The first voltage source provides a first reference voltage VrefA. The second voltage source provides a second reference voltage VrefA'. The first reference voltage VrefA and the second reference voltage VrefA' have different levels The first selection terminal of the switch 251 is coupled to the first voltage source for receiving the first reference voltage VrefA. The second selection terminal of the switch 251 is coupled to the second voltage source for receiving the second reference voltage VrefA'. The common terminal of the switch 251 is coupled to the Coriolis accelerometer 12. The switch 251 provides the first reference voltage VrefA or the second reference voltage VrefA' to the Coriolis accelerometer 12 as the modulation signal Sc according to the output of the latch 230.

Referring to FIG. 2, the input terminal of the integrator 210 is coupled to the output terminal of the high pass filter 120. The input terminal of the comparator 220 is coupled to the output terminal of the integrator 210. The input terminal of the latch 230 is coupled to the output terminal of the comparator 220 for receiving and latching the output of the comparator 220 according to a clock signal CLK. The comparator 220 compares the output of the integrator 210 with a threshold and outputs a comparison result. The latch 230 latches the comparison result of the comparator 220. Thus, the comparator 220 and the latch 230 can quantize or digitize the analog output of the integrator 210 and provide a digital signal to the demodulator 240.

The first input terminal of the demodulator 240 is coupled to the output terminal of the latch 230. The second input terminal of the demodulator 240 is coupled to the driving unit 110 for receiving the demodulation signal Sr'. The demodulator 240 can remove the resonance signal in the output signal of the Coriolis accelerometer 12. In the embodiment, the demodulator 240 may be an exclusive-OR gate. The demodulator 240 outputs a digital demodulation result to the low pass filter 140 through the output terminal thereof. The low pass filter 140 may be a digital filter. The low pass filter 140 can filter out the modulation signal in the Sigma-Delta circuit and output a low-frequency angular rate information.

As described above, in the embodiment, an angular rate information of the Coriolis accelerometer 12 is modulated to a high frequency according to the modulation signal Sc. Thus, the output of the Coriolis accelerometer 12 may contain a low-frequency noise signal from the resonator 11 and a high-frequency signal carrying the angular rate information and the resonator's oscillation information. The high pass filter 120 can filter out the low-frequency noise signal and transmit the high-frequency signal carrying the angular rate information and the resonator's oscillation information to the signal processing unit 130, and the signal processing unit 130 can demodulate the high-frequency signal according to the demodulation signal Sr' to obtain the angular-rate signal. Thus, the stray signal of the resonator 11 can be stopped in the embodiment. Additionally, the integrator 210 may be a switched-capacitor integrator or any other integration circuit. The integrator 210 can convert the output signal of the Coriolis accelerometer 12 into a not return to zero (NRZ) signal. Accordingly, the signal processing unit 130 and the low pass filter 140 of the reading circuit 100 in the embodiment can operate in a digital way and output digital signals. Thereby, no additional ADC is required in the reading circuit 100 provided by the embodiment.

Figure 3:
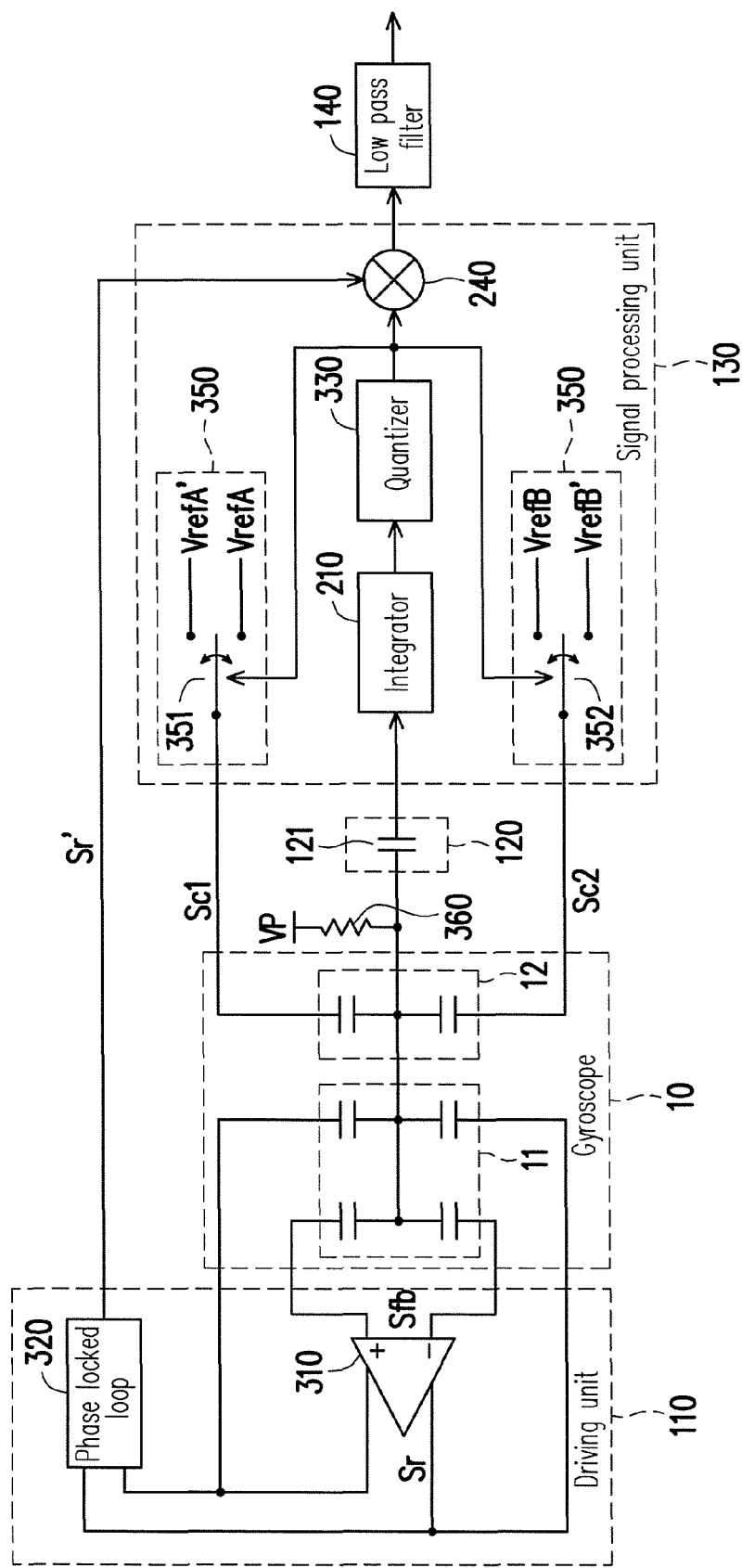
FIG. 3 is a block diagram of the reading circuit in FIG. 1 according to another embodiment of the disclosure.

FIG. 3 is a block diagram of the reading circuit 100 in FIG. 1 according to another embodiment of the disclosure. FIG. 3 illustrates equivalent circuits of the resonator 11 and the Coriolis accelerometer 12 in the gyroscope 10. However, the implementation of the gyroscope 10 is not limited to that illustrated in FIG. 3. The embodiment illustrated in FIG. 3 can be referred to related descriptions of FIG. 1 and FIG. 2. In the embodiment illustrated in FIG. 3, the driving unit 110 includes an amplifier 310 and a phase locked loop (PLL) 320. The amplifier 310 may also offer the function of an auto gain control (ACG) circuit. The first input terminal (for example, a non-inverting input terminal) and the second input terminal (for example, an inverting input terminal) of the amplifier 310 are respectively coupled to the first sensing terminal and the second sensing terminal of the resonator 11. The first output terminal (for example, a non-inverting output terminal) and the second output terminal (for example, an inverting output terminal) of the amplifier 310 are respectively coupled to the first driving terminal and the second driving terminal of the resonator 11 for providing the resonance signal Sr. The first input terminal and the second input terminal of the PLL 320 are respectively coupled to the first output terminal and the second output terminal of the amplifier 310. The output terminal of the PLL 320 provides the demodulation signal Sr' to the signal processing unit 130.

In the embodiment illustrated in FIG. 3, the reading circuit of the gyroscope 10 further includes a bias resistor 360. The first end of the bias resistor 360 is coupled to the input terminal of the high pass filter 120, and the second end of the bias resistor 360 is coupled to a reference voltage VP. The bias resistor 360 and the reference voltage VP can provide a predetermined DC level.

The high pass filter 120 includes a capacitor 121. The first end of the capacitor 121 is served as the input terminal of the high pass filter 120. The second end of the capacitor 121 is served as the output terminal of the high pass filter 120. In other embodiments, the implementation of the high pass filter 120 is not limited to that illustrated in FIG. 3.

In the embodiment illustrated in FIG. 3, the signal processing unit 130 includes the integrator 210, a quantizer 330, the demodulator 240, and a modulation signal generator 350. The input terminal of the integrator 210 is coupled to the output terminal of the high pass filter 120. The input terminal of the quantizer 330 is coupled to the output terminal of the integrator 210. The quantizer 330 quantizes the output of the integrator 210 and outputs a control signal of the modulation signal generator 350 to determine the frequencies of modulation signals Sc1 and Sc2. The first input terminal of the demodulator 240 is coupled to the output terminal of the quantizer 330. The second input terminal of the demodulator 240 is coupled to the driving unit 110 for receiving the demodulation signal Sr'. The demodulator 240 outputs a demodulation result to the low pass filter 140 through the output terminal thereof.

The modulation signal generator 350 is coupled to the Coriolis accelerometer 12 for providing the modulation signals Sc1 and Sc2. In the embodiment, the modulation signal generator 350 includes a voltage source, a first switch 351, and a second switch 352. The voltage source provides the first reference voltage VrefA, the second reference voltage VrefA', a third reference voltage VrefB, and a fourth reference voltage VrefB'. The first reference voltage VrefA and the second reference voltage VrefA' have different levels, and the third reference voltage VrefB and the fourth reference voltage VrefB' have different levels.

The first selection terminal of the first switch 351 receives the first reference voltage VrefA. The second selection terminal of the first switch 351 receives the second reference voltage VrefA'. The common terminal of the first switch 351 is coupled to the first carrier input terminal of the Coriolis accelerometer 12. The first switch 351 outputs the first reference voltage VrefA or the second reference voltage VrefA' to the first carrier input terminal of the Coriolis accelerometer 12 as the modulation signal Sc1 according to the output of the quantizer 330.

The first selection terminal of the second switch 352 receives the third reference voltage VrefB. The second selection terminal of the second switch 352 receives the fourth reference voltage VrefB'. The common terminal of the second switch 352 is coupled to the second carrier input terminal of the Coriolis accelerometer 12. The second switch 352 outputs the third reference voltage VrefB or the fourth reference voltage VrefB' to the second carrier input terminal of the Coriolis accelerometer 12 as the modulation signal Sc2 according to the output of the quantizer 330.

Figure 4:
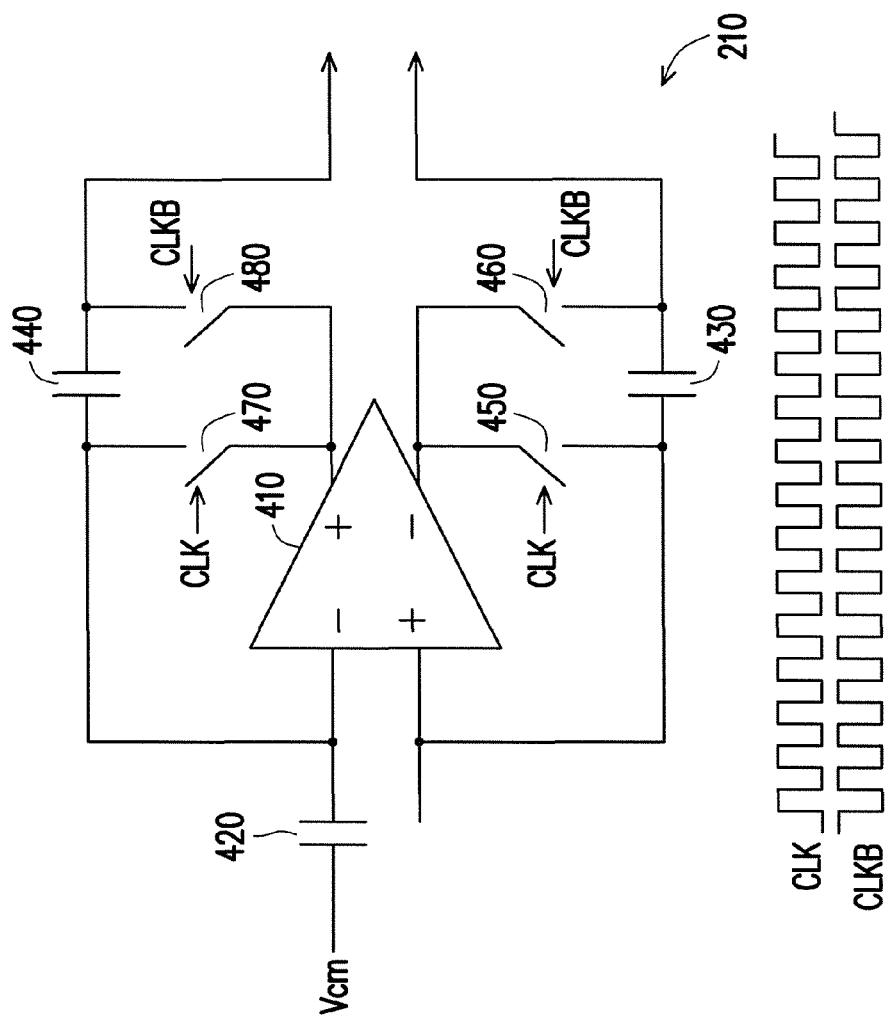
FIG. 4 is a diagram of an integrator in FIG. 2 and/or FIG. 3 according to an embodiment of the disclosure.

The integrator 210 in FIG. 2 and/or FIG. 3 may be any integration circuit. FIG. 4 is a diagram of the integrator 210 in FIG. 2 and/or FIG. 3 according to an embodiment of the disclosure. The integrator 210 includes an amplifier 410, a first capacitor 420, a second capacitor 430, a third capacitor 440, a first switch 450, a second switch 460, a third switch 470, and a fourth switch 480. The amplifier 410 may be an operational amplifier or any other amplification circuit. The first input terminal (for example, a non-inverting input terminal) of the amplifier 410 is served as the input terminal of the integrator 210 and coupled to the high pass filter 120. The first end of the first capacitor 420 is coupled to a common mode voltage Vcm. The second end of the first capacitor 420 is coupled to the second input terminal (for example, an inverting input terminal) of the amplifier 410.

The first end of the second capacitor 430 is coupled to the first input terminal of the amplifier 410. The first end of the third capacitor 440 is coupled to the second input terminal of the amplifier 410. The second ends of the second capacitor 430 and the third capacitor 440 are served as the output terminal of the integrator 210 and coupled to the quantizer 330.

The first terminal of the first switch 450 is coupled to the first end of the second capacitor 430. The second terminal of the first switch 450 is coupled to the first output terminal (for example, an inverting output terminal) of the amplifier 410. The first terminal of the second switch 460 is coupled to the second end of the second capacitor 430. The second terminal of the second switch 460 is coupled to the first output terminal of the amplifier 410. The first terminal of the third switch 470 is coupled to the first end of the third capacitor 440. The second terminal of the third switch 470 is coupled to the second output terminal (for example, a non-inverting output terminal) of the amplifier 410. The first terminal of the fourth switch 480 is coupled to the second end of the third capacitor 440. The second terminal of the fourth switch 480 is coupled to the second output terminal of the amplifier 410. The first switch 450 and the third switch 470 are controlled by a clock signal CLK, and the second switch 460 and the fourth switch 480 are controlled by an inverting clock signal CLKB, as shown in FIG. 4.

Figure 5:
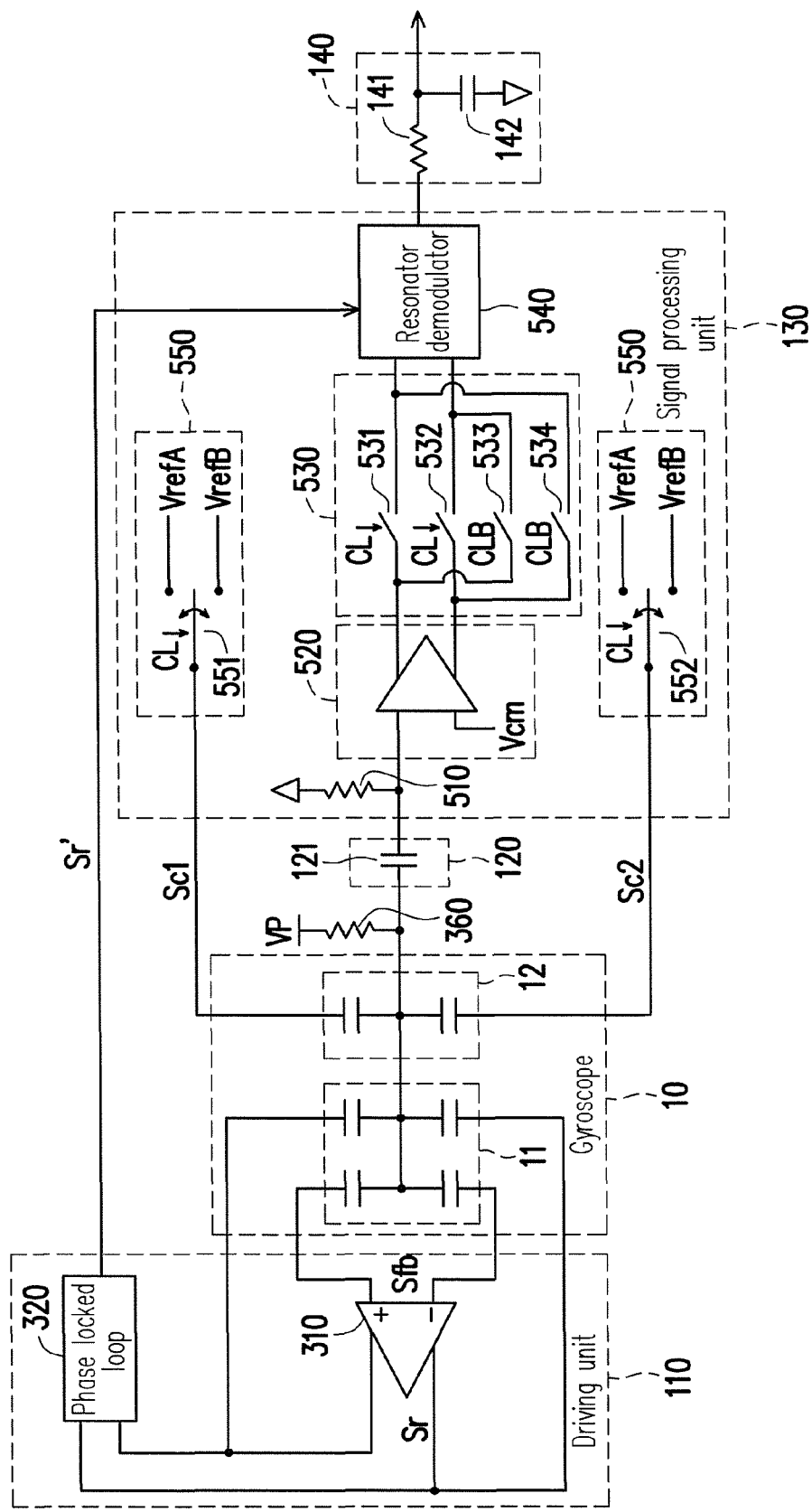
FIG. 5 is a block diagram of the reading circuit in FIG. 1 according to yet another embodiment of the disclosure.

FIG. 5 is a block diagram of the reading circuit 100 in FIG. 1 according to yet another embodiment of the disclosure. In the embodiment illustrated in FIG. 5, the signal processing unit 130 includes an amplifier 520, a bias resistor 510, a high frequency demodulator 530, a resonator demodulator 540, and a modulation signal generator 550. The input terminal of the amplifier 520 is coupled to the output terminal of the high pass filter 120. The first end of the bias resistor 510 is coupled to the input terminal of the amplifier 520. The second end of the bias resistor 510 is coupled to a reference voltage, such as a ground voltage or any other constant voltage. The bias resistor 510 provides a predetermined DC level to the input terminal of the amplifier 520.

The first input terminal and the second input terminal of the high frequency demodulator 530 are respectively coupled to the first output terminal and the second output terminal of the amplifier 520. The first input terminal and the second input terminal of the resonator demodulator 540 are respectively coupled to the first output terminal and the second output terminal of the high frequency demodulator 530. The resonator demodulator 540 receives and demodulates the output of the high frequency demodulator 530 according to the demodulation signal Sr' and provides the demodulation result to the low pass filter 140.

The modulation signal generator 550 is coupled to the Coriolis accelerometer 12 for providing the modulation signals Sc1 and Sc2. In the embodiment, the modulation signal generator 550 includes a first voltage source, a second voltage source, a first switch 551, and a second switch 552. The first voltage source provides a first reference voltage VrefA. The second voltage source provides a second reference voltage VrefB. The first selection terminal of the first switch 551 receives the first reference voltage VrefA. The second selection terminal of the first switch 551 receives the second reference voltage VrefB. The common terminal of the first switch 551 is coupled to the first carrier input terminal of the Coriolis accelerometer 12. The first switch 551 outputs the first reference voltage VrefA or the second reference voltage VrefB to the first carrier input terminal of the Coriolis accelerometer 12 according to a clock signal CL. The first selection terminal of the second switch 552 receives the first reference voltage VrefA. The second selection terminal of the second switch 552 receives the second reference voltage VrefB. The common terminal of the second switch 552 is coupled to the second carrier input terminal of the Coriolis accelerometer 12. The second switch 552 outputs the first reference voltage VrefA or the second reference voltage VrefB to the second carrier input terminal of the Coriolis accelerometer 12 according to the clock signal CL.

The high frequency demodulator 530 includes a first switch 531, a second switch 532, a third switch 533, and a fourth switch 534. The first terminal of the first switch 531 is coupled to the first output terminal of the amplifier 520. The second terminal of the first switch 531 is coupled to the first input terminal of the resonator demodulator 540. The first terminal of the second switch 532 is coupled to the second output terminal of the amplifier 520. The second terminal of the second switch 532 is coupled to the second input terminal of the resonator demodulator 540. The first terminal of the third switch 533 is coupled to the first output terminal of the amplifier 520. The second terminal of the third switch 533 is coupled to the second input terminal of the resonator demodulator 540. The first terminal of the fourth switch 534 is coupled to the second output terminal of the amplifier 520. The second terminal of the fourth switch 534 is coupled to the first input terminal of the resonator demodulator 540. The first switch 531 and the second switch 532 are controlled by the clock signal CL, and the third switch 533 and the fourth switch 534 are controlled by an inverting clock signal CLB.

Thus, when the first switch 531 and the second switch 532 are turned on, the third switch 533 and the fourth switch 534 are turned off. Contrarily, when the first switch 531 and the second switch 532 are turned off, the third switch 533 and the fourth switch 534 are turned on.

In the embodiment, the low pass filter 140 includes a resistor 141 and a capacitor 142. The first end of the resistor 141 is served as the input terminal of the low pass filter 140. The second end of the resistor 141 is served as the output terminal of the low pass filter 140. The first end of the capacitor 142 is coupled to the second end of the resistor 141. The second end of the capacitor 142 is coupled to a reference voltage, such as a ground voltage or any other constant voltage.

Figure 6:
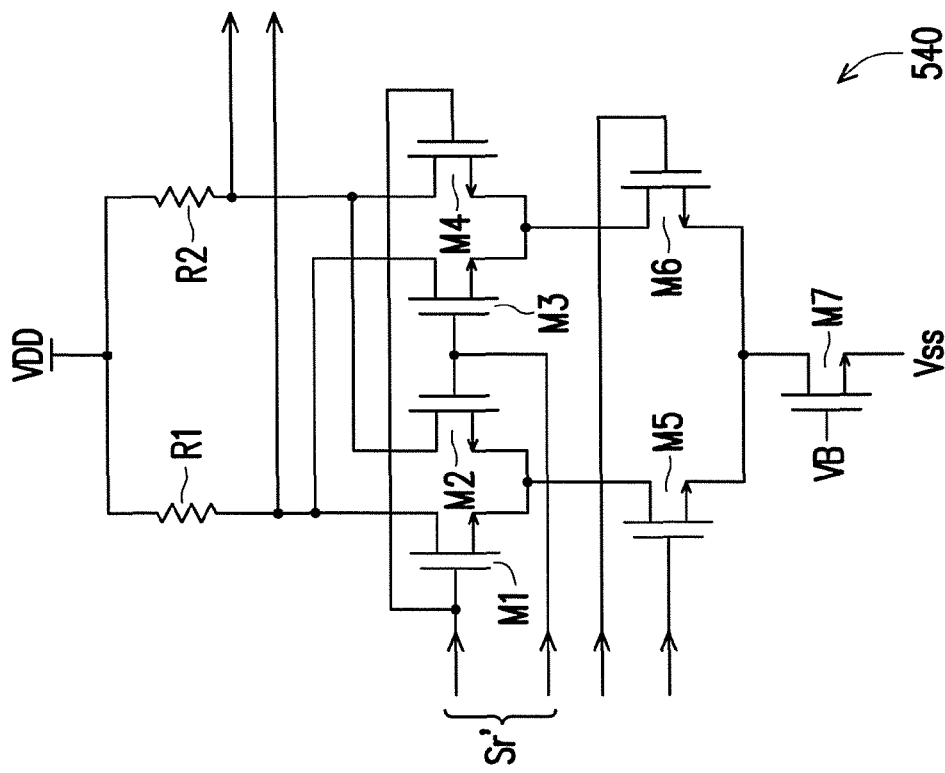
FIG. 6 is a diagram of a resonator demodulator in FIG. 5 according to an embodiment of the disclosure.

The resonator demodulator 540 can be implemented by referring to FIG. 6. FIG. 6 is a diagram of the resonator demodulator 540 in FIG. 5 according to an embodiment of the disclosure. The resonator demodulator 540 includes a first resistor R1, a second resistor R2, a first transistor M1, a second transistor M2, a third transistor M3, a fourth transistor M4, a fifth transistor M5, a sixth transistor M6, and a seventh transistor M7. The first ends of the first resistor R1 and the second resistor R2 are coupled to a first voltage, such as a system voltage VDD. The second ends of the first resistor R1 and/or the second resistor R2 are served as the output terminal of the resonator demodulator 540 and coupled to the low pass filter 140.

The first terminal (for example, the drain) of the first transistor M1 is coupled to the second end of the first resistor R1. The first terminal (for example, the drain) of the second transistor M2 is coupled to the second end of the second resistor R2. The second terminal (for example, the source) of the second transistor M2 is coupled to the second terminal (for example, the source) of the first transistor M1. The first terminal (for example, the drain) of the third transistor M3 is coupled to the second end of the first resistor R1. The first terminal (for example, the drain) of the fourth transistor M4 is coupled to the second end of the second resistor R2. The second terminal (for example, the source) of the fourth transistor M4 is coupled to the second terminal (for example, the source) of the third transistor M3. The control terminals (for example, the gates) of the first transistor M1 and the fourth transistor M4 receive a first terminal signal of the demodulation signal Sr', and the control terminals (for example, the gates) of the second transistor M2 and the third transistor M3 receive a second terminal signal of the demodulation signal Sr'.

The first terminal (for example, the drain) of the fifth transistor M5 is coupled to the second terminals of the first transistor M1 and the second transistor M2. The first terminal (for example, the drain) of the sixth transistor M6 is coupled to the second terminals of the third transistor M3 and the fourth transistor M4. The second terminal (for example, the source) of the sixth transistor M6 is coupled to the second terminal (for example, the source) of the fifth transistor M5. The control terminal (for example, the gate) of the fifth transistor M5 is coupled to the first output terminal of the high frequency demodulator 530, and the control terminal (for example, the source) of the sixth transistor M6 is coupled to the second output terminal of the high frequency demodulator 530. The first terminal (for example, the drain) of the seventh transistor M7 is coupled to the second terminals of the fifth transistor M5 and the sixth transistor M6. The control terminal (for example, the gate) of the seventh transistor M7 is coupled to a bias voltage VB. The bias voltage VB is determined according to the actual design requirement. The second terminal M7 of the seventh transistor M7 is coupled to a reference voltage, such as a ground voltage VSS.

As described above, in each embodiment described above, the modulation signal Sc is input to the Coriolis accelerometer 12 to modulate the output signal of the Coriolis accelerometer 12 to a high frequency, and a noise signal from the resonator 11 is filtered out by using the high pass filter 120. Thereby, the reading circuit of the gyroscope 10 in each embodiment described above can resolve the problem of interference produced by a resonance signal of the resonator 11 on the output signal of the Coriolis accelerometer 12.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A reading circuit of a gyroscope, comprising:
    a driving unit, generating a resonance signal for a resonator of the gyroscope, and generating a demodulation signal;
    a high pass filter, having an input terminal for receiving an output signal of a Coriolis accelerometer of the gyroscope;
    a signal processing unit, coupled to the driving unit and the high pass filter, providing a modulation signal to the Coriolis accelerometer, and processing and demodulating an output of the high pass filter according to the demodulation signal to output a demodulation result, wherein the signal processing unit comprises:
        an integrator, having an input terminal coupled to an output terminal of the high pass filter;
        a comparator, having an input terminal coupled to an output terminal of the integrator, and comparing an output of the integrator with a threshold;
        a latch, having an input terminal coupled to an output terminal of the comparator, and latching an output of the comparator according to a clock signal;
        a demodulator, having a first input terminal coupled to an output terminal of the latch, a second input terminal coupled to the driving unit for receiving the demodulation signal, and an output terminal for outputting the demodulation result; and
        a modulation signal generator, coupled to the Coriolis accelerometer for providing the modulation signal; and
    a low pass filter, coupled to the signal processing unit and receiving the demodulation result.

2. The reading circuit according to claim 1, wherein the resonance signal and the demodulation signal have a same frequency, and the resonance signal and the demodulation signal have different phases.

3. The reading circuit according to claim 1, wherein a frequency of the modulation signal is greater than a frequency of the resonance signal.

4. The reading circuit according to claim 1 further comprising:
    a bias resistor, wherein a first end of the bias resistor is coupled to the input terminal of the high pass filter, and a second end of the bias resistor is coupled to a reference voltage.

5. The reading circuit according to claim 1, wherein the high pass filter comprises:
    a capacitor, wherein a first end of the capacitor is served as the input terminal of the high pass filter, and a second end of the capacitor is served as an output terminal of the high pass filter.

6. The reading circuit according to claim 1, wherein the low pass filter comprises:
    a resistor, wherein a first end of the resistor is served as an input terminal of the low pass filter, and a second end of the resistor is served as an output terminal of the low pass filter; and
    a capacitor, wherein a first end of the capacitor is coupled to the second end of the resistor, and a second end of the capacitor is coupled to a reference voltage.

7. The reading circuit according to claim 1, wherein the driving unit comprises:
    an amplifier, having a first input terminal and a second input terminal respectively coupled to a first sensing terminal and a second sensing terminal of the resonator, wherein a first output terminal and a second output terminal of the amplifier respectively coupled to a first driving terminal and a second driving terminal of the resonator for providing the resonance signal; and
    a phase locked loop (PLL), having a first input terminal and a second input terminal respectively coupled to the first output terminal and the second output terminal of the amplifier, wherein an output terminal of the PLL provides the demodulation signal to the signal processing unit.

8. The reading circuit according to claim 1, wherein the modulation signal generator comprises:
    a first voltage source, providing a first reference voltage;
    a second voltage source, providing a second reference voltage; and
    a switch, having a first selection terminal coupled to the first voltage source, a second selection terminal coupled to the second voltage source, and a common terminal coupled to the Coriolis accelerometer, wherein the switch outputs the first reference voltage or the second reference voltage to the Coriolis accelerometer as the modulation signal according to an output of the latch.

9. A reading circuit of a gyroscope, comprising:
    a driving unit, generating a resonance signal for a resonator of the gyroscope, and generating a demodulation signal;
    a high pass filter, having an input terminal for receiving an output signal of a Coriolis accelerometer of the gyroscope;
    a signal processing unit, coupled to the driving unit and the high pass filter, providing a modulation signal to the Coriolis accelerometer, and processing and demodulating an output of the high pass filter according to the demodulation signal to output a demodulation result, wherein the signal processing unit comprises:
        an integrator, having an input terminal coupled to an output terminal of the high pass filter;
        a quantizer, having an input terminal coupled to an output terminal of the integrator, and quantizing an output of the integrator;
        a demodulator, having a first input terminal coupled to an output terminal of the quantizer, a second input terminal coupled to the driving unit for receiving the demodulation signal, and an output terminal for outputting the demodulation result; and
        a modulation signal generator, coupled to the Coriolis accelerometer for providing the modulation signal; and
    a low pass filter, coupled to the signal processing unit and receiving the demodulation result.

10. The reading circuit according to claim 9, wherein the modulation signal generator comprises:

a voltage source, providing a first reference voltage, a second reference voltage, a third reference voltage, and a fourth reference voltage;

a first switch, having a first selection terminal for receiving the first reference voltage, a second selection terminal for receiving the second reference voltage, and a common terminal coupled to a first carrier input terminal of the Coriolis accelerometer, wherein the first switch outputs the first reference voltage or the second reference voltage to the first carrier input terminal of the Coriolis accelerometer according to an output of the quantizer; and a second switch, having a first selection terminal for receiving the third reference voltage, a second selection terminal for receiving the fourth reference voltage, and a common terminal coupled to a second carrier input terminal of the Coriolis accelerometer, wherein the second switch outputs the third reference voltage or the fourth reference voltage to the second carrier input terminal of the Coriolis accelerometer according to the output of the quantizer.

11. The reading circuit according to claim 9, wherein the integrator comprises:
   an amplifier, having a first input terminal served as the input terminal of the integrator;
   a first capacitor, having a first end coupled to a common mode voltage, and a second end coupled to a second input terminal of the amplifier;
   a second capacitor, having a first end coupled to the first input terminal of the amplifier;
   a third capacitor, having a first end coupled to the second input terminal of the amplifier, wherein second ends of the second capacitor and the third capacitor are served as the output terminal of the integrator;
   a first switch, having a first end coupled to the first end of the second capacitor, and a second end coupled to a first output terminal of the amplifier;
   a second switch, having a first end coupled to the second end of the second capacitor, and a second end coupled to the first output terminal of the amplifier;
   a third switch, having a first end coupled to the first end of the third capacitor, and a second end coupled to a second output terminal of the amplifier; and
   a fourth switch, having a first end coupled to the second end of the third capacitor, and a second end coupled to the second output terminal of the amplifier.

12. A reading circuit of a gyroscope, comprising:
   a driving unit, generating a resonance signal for a resonator of the gyroscope, and generating a demodulation signal;
   a high pass filter, having an input terminal for receiving an output signal of a Coriolis accelerometer of the gyroscope;
   a signal processing unit, coupled to the driving unit and the high pass filter, providing a modulation signal to the Coriolis accelerometer, and processing and demodulating an output of the high pass filter according to the demodulation signal to output a demodulation result, wherein the signal processing unit comprises:
      an amplifier, having an input terminal coupled to an output terminal of the high pass filter;
      a high frequency demodulator, having a first input terminal and a second input terminal respectively coupled to a first output terminal and a second output terminal of the amplifier;
      a resonator demodulator, having a first input terminal and a second input terminal respectively coupled to a first output terminal and a second output terminal of the high frequency demodulator, and the resonator demodulator receiving the demodulation signal and demodulating an output of the high frequency demodulator according to the demodulation signal to provide the demodulation result to the low pass filter; and
      a modulation signal generator, coupled to the Coriolis accelerometer and providing the modulation signal; and
   a low pass filter, coupled to the signal processing unit and receiving the demodulation result.

13. The reading circuit according to claim 12, wherein the signal processing unit further comprises:
   a bias resistor, having a first end coupled to the input terminal of the amplifier and a second end coupled to a reference voltage.

14. The reading circuit according to claim 12, wherein the modulation signal generator comprises:
   a first voltage source, providing a first reference voltage;
   a second voltage source, providing a second reference voltage;
   a first switch, having a first selection terminal for receiving the first reference voltage, a second selection terminal for receiving the second reference voltage, and a common terminal coupled to a first carrier input terminal of the Coriolis accelerometer, wherein the first switch outputs the first reference voltage or the second reference voltage to the first carrier input terminal of the Coriolis accelerometer according to a clock signal; and
   a second switch, having a first selection terminal for receiving the first reference voltage, a second selection terminal for receiving the second reference voltage, and a common terminal coupled to a second carrier input terminal of the Coriolis accelerometer, wherein the second switch outputs the first reference voltage or the second reference voltage to the second carrier input terminal of the Coriolis accelerometer according to the clock signal.

15. The reading circuit according to claim 12, wherein the high frequency demodulator comprises:
   a first switch, having a first end coupled to the first output terminal of the amplifier, and a second end coupled to the first input terminal of the resonator demodulator;
   a second switch, having a first end coupled to the second output terminal of the amplifier, and a second end coupled to the second input terminal of the resonator demodulator;
   a third switch, having a first end coupled to the first output terminal of the amplifier, and a second end coupled to the second input terminal of the resonator demodulator; and
   a fourth switch, having a first end coupled to the second output terminal of the amplifier, and a second end coupled to the first input terminal of the resonator demodulator.

16. The reading circuit according to claim 12, wherein the resonator demodulator comprises:
   a first resistor, having a first end coupled to a first voltage;
   a second resistor, having a first end coupled to the first voltage;
   a first transistor, having a first terminal coupled to a second end of the first resistor, and a control terminal for receiving a first terminal signal of the demodulation signal;
   a second transistor, having a first terminal coupled to a second end of the second resistor, a second terminal coupled to a second terminal of the first transistor, and a control terminal for receiving a second terminal signal of the demodulation signal;

a third transistor, having a first terminal coupled to the second end of the first resistor, and a control terminal for receiving the second terminal signal of the demodulation signal;

a fourth transistor, having a first terminal coupled to the second end of the second resistor, a second terminal coupled to a second terminal of the third transistor, and a control terminal for receiving the first terminal signal of the demodulation signal;

a fifth transistor, having a first terminal coupled to the second terminals of the first transistor and the second transistor, and a control terminal coupled to the first output terminal of the high frequency demodulator;

a sixth transistor, having a first terminal coupled to the second terminals of the third transistor and the fourth transistor, a second terminal coupled to a second terminal of the fifth transistor, and a control terminal coupled to the second output terminal of the high frequency demodulator; and a seventh transistor, having a first terminal coupled to the second terminals of the fifth transistor and the sixth transistor, a second terminal coupled to a reference voltage, and a control terminal coupled to a bias voltage.

* * * * *